March 24, 1959 F. C. AEBERSOLD 2,878,689
TUNED VIBRATION DAMPING SYSTEM FOR DRIVE TRAINS
Filed Oct. 9, 1957
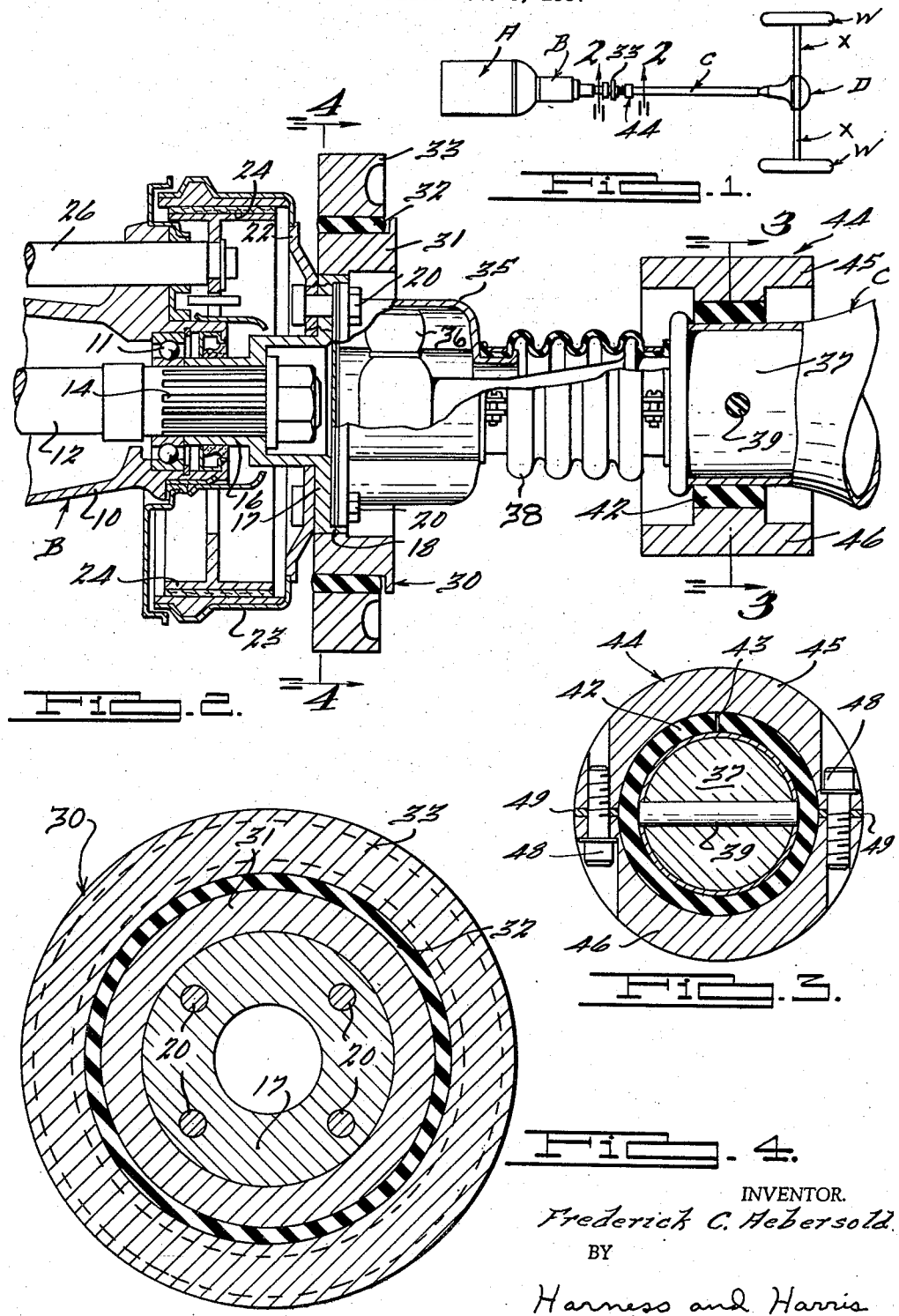
INVENTOR.
Frederick C. Aebersold
BY
Harness and Harris
ATTORNEYS.

United States Patent Office 2,878,689
Patented Mar. 24, 1959

2,878,689

TUNED VIBRATION DAMPING SYSTEM FOR DRIVE TRAINS

Frederick C. Aebersold, Highland Park, Mich., assignor to Chrysler Corporation, Highland Park, Mich., a corporation of Delaware Application October 9, 1957, Serial No. 689,199

13 Claims. (Cl. 74—574)

This invention relates to a tuned vibration damping system for motor vehicle or similar drive trains wherein a pair of damping units are arranged in such a manner in the drive train that an extremely effective means for counteracting noise producing vibrational disturbances in the drive train is achieved.

It is a primary object of this invention to arrange a pair of differently tuned vibration damping units on selected spaced parts of a vehicle or similar drive train to reduce or eliminate the noise producing vibrational disturbances that originate in the drive train.

It is still another object of this invention to provide a tuned vibration damping system for a drive train that includes a pair of universal joint connected shafts, said system having a pair of differently tuned vibration damping units arranged on the shafting on opposite sides of the universal joint.

It is still another object of this invention to provide an improved and simplified form of vibration damper unit adapted for installation adjacent a transmission brake drum or the like.

It is still another object of this invention to provide an improved and simplified form of propeller shaft mounted vibration damper unit that can be readily adapted to a plurality of different drive trains.

Other objects and advantages of this invention will become readily apparent from a reading of the following description and a consideration of the related drawings wherein:

Fig. 1 is a diagrammatic view of a motor vehicle drive train;

Fig. 2 is an enlarged fragmentary sectional elevational view through a portion of the disclosed drive train shafting, the view being taken along the line 2—2 of Fig. 1;

Fig. 3 is a sectional elevational view taken along the line 3—3 of Fig. 2; and

Fig. 4 is a sectional elevational view taken along the line 4—4 of Fig. 2.

In the drawings Fig. 1 shows diagrammatically a motor vehicle drive train comprising an engine A drivingly connected through a transmission unit B to the drive shaft C. Drive shaft C is connected to a differential gear unit D that transmits drive through the axles X, X to the pair of spaced road wheels W, W.

From Fig. 2 it will be noted that the transmission unit B includes a hollow casing portion 10 at its rear end that journals, through a ball bearing assembly 11, the output shaft 12 of the transmission unit B. The rear end of the transmission output shaft 12 is formed with splines 14 to which is drivingly connected the flanged drive collar 16. Collar 16 has a radially extending flange portion 17 at its rear end that terminates in an axially extending flange portion 18. The radially extending flange portion 17 of collar 16 has bolted thereto, by bolts 20, the radially extending flange 22 of the transmission brake drum 23. Brake drum 23 is adapted to be frictionally engaged along its interior surface by the expanding shoes 24 of an internally expanding, manually operable, drive shaft brake mechanism. The transmission casing supported stub shaft 26 provides the anchor means for the brake shoes 24. The details of the brake mechanism shown are not important nor are they required for a full understanding of this invention so no further description of the brake mechanism will be given. Suffice it to say that this type of hand brake mechanism has been used for a number of years and is currently being used on the passenger vehicles produced by the Chrysler Corporation.

From Fig. 2 it will also be noted that the axially extending flange 18 of the transmission output shaft drive collar 16 has press-fitted thereon a metallic support ring 31 of a low frequency vibration damper unit 30. The low frequency vibration damper unit 30 also includes a resilient ring member 32 of rubber or rubber-like resilient material that is surrounded by and connected to the inertia ring member 33 of the damper unit 30. This low frequency vibration damper unit 30 is preferably tuned to a frequency of between 200 and 300 c.p.s. in vehicle installations of the type herein disclosed. The resilient ring 32 is preferably retained between the support ring 31 and the inertia ring 33 by the forces resulting from compression of the resilient ring 32 during assembly thereof between the rings 31 and 33. Obviously resilient ring 32 could be bonded to one or both of the rings 31, 33 if such should be desired or some other retaining means could be used.

From Fig. 2 it will be noted that the bolts 20 that connect the brake drum 23 to the transmission output shaft collar 16 also connect the output shaft 12 to the housing 35 of a ball and trunnion, or similar type, universal joint. The universal joint housing 35 is connected through pin and ball means 36 to the drive stud 37 projecting forwardly from the end of the hollow drive shaft C. A bellows type resilient boot 38 encircles the drive stud 37 between the forward end of hollow shaft C and the rear end of the housing 35. Boot 38 protects the universal joint against the entrance of foreign matter and also helps to retain the lubricant therein.

As can be clearly seen from Fig. 2, the drive shaft C is hollow for most of its length and is necked-down at its forward end to matingly receive the drive stud 37 that is retained by means of an anchor pin 39 and/or welding. Extending about the exterior surface of the necked-down forward end portion of the drive shaft C is a rubber or rubber-like ring 42. The resilient ring 42 may be a closed ring or it may merely be a flat strip of material that is wrapped around the end of the shaft with the ends 43 thereof in closely adjacent abutting relationship. Locked about the resilient ring 42 is a two-piece inertia ring member that is composed of the two C-shaped sections 45 and 46 that are interconnected by the bolts 48. Sections 45, 46 may be T shaped in cross-section as shown. Washers 49 may be used between the abutting ends of the ring sections 45, 46 to limit the degree of compression of the resilient ring 42.

The resilient ring 42 and the encircling inertia ring 45, 46 provide a high frequency vibration damper unit 44 that is preferably tuned to approximately 500–600 c.p.s. The advantage of using a vibration damper unit 44 of the disclosed type may not be readily apparent. It will be found that in any manufacturer's line of vehicles, because of different kinds of engines, transmission, and the like, that different speeds and torques are transmitted by the drive train and consequently the diameter of the shafts C may vary. However, because the same universal joints are usually used with the several different drive shafts, the several different diameter shafts C all neck-down to approximately the same dimension at their forward end portions and thus there is only one size high frequency vibration damper unit 44 required for the several different drive shafts C. Also, from extensive instrumentation tests it has been found that in a drive train of the type disclosed, the two critical positions for damping vibrations in the drive train are immediately adjacent opposite sides of the universal joint connecting the transmission output shaft 12 to the drive shaft C. From the various instrumentation tests it was found that by placing a pair of differently tuned vibration dampers at the critical locations on opposite sides of the transmission output shaft universal joint that much smaller vibration damper units could be used and thus there is a saving in weight and cost in addition to improved damping effectiveness. From the instrumentation tests it was also determined that the front universal joint acts as a drive train spring element during the transmission of drive torque and thus the location of the pair of differently tuned vibration dampers units 30, 44 on opposite sides of this drive train spring element is most effective in preventing objectionable drive train vibrational disturbances. Also, there is some torsional wind-up in the drive shaft C during the transmission of drive and tests have shown that the maximum vibrational effect of this torsional wind-up of shaft C is present at the forwardmost end portion of the shaft C adjacent its connection to the universal joint housing 35. Accordingly, location of the high frequency damper unit 44 on the necked-down front end portion of drive shaft C produces maximum improvement at minimum cost.

The vibration damper unit 30 is associated with the transmission output shaft brake mechanism in such a manner that it is of minimum size and is not directly affected by the heat generated during application of the associated brake. It has been suggested in the past that an inertia type vibration damper unit, similar to the unit 30, be directly mounted on the brake drum 23. Such an installation requires a damper unit of relatively large diameter and thus it is more costly than the compact unit 30 herein disclosed. Secondly, in these past constructions, because of the damper unit being directly mounted on the brake drum, heat generated during braking adversely affected the resilient element of the damper unit and caused rapid deterioration thereof in addition to a pronounced variation in the damper unit frequency. The disclosed installation readily avoids the disadvantages of prior constructions.

The damper unit 30 herein disclosed is readily installed by merely pressing the support ring 31 on the existing axially directed flange 18 of the drive collar 16. The inertia ring 33 and the resilient ring 32 can be preassembled on the support ring 31 before ring 31 is pressed on the collar flange 18. The damper unit 30, in its general structure is identical to certain crankshaft vibration damper units that have previously been used in the automotive industry. The novel arrangement of the unit 30 and its cooperation with the unit 44 are thought to be the patentable improvements herein disclosed as well as the specific structure and location of the drive shaft mounted damper unit 44.

I claim:

1. In a motor vehicle drive train comprising a transmission output shaft and a drive shaft having adjacent end portions drivingly interconnected by a universal joint, a first tuned vibration damper unit drivingly connected to said output shaft adjacent said universal joint, and a second tuned vibration damper unit drivingly connected to said drive shaft adjacent said universal joint.

2. In a motor vehicle drive train comprising a transmission output shaft and a drive shaft having adjacent end portions drivingly interconnected by a universal joint, a first tuned vibration damper unit drivingly connected to said output shaft adjacent said universal joint, and a second tuned vibration damper unit drivingly connected to said drive shaft adjacent said universal joint, said vibration damper units each being tuned to a different frequency.

3. In a motor vehicle drive train comprising a transmission output shaft and a drive shaft having adjacent end portions drivingly interconnected by a universal joint, a first tuned, inertia type, vibration damper unit drivingly connected about said output shaft immediately adjacent one end of said universal joint, and a second tuned, inertia type, vibration damper unit drivingly connected about said drive shaft immediately adjacent the other end of said universal joint.

4. In a motor vehicle drive train comprising a transmission output shaft and a drive shaft having adjacent end portions drivingly interconnected by a universal joint, a first tuned, inertia type, vibration damper unit drivingly connected about said output shaft immediately adjacent one end of said universal joint, and a second tuned, inertia type, vibration damper unit drivingly connected about said drive shaft immediately adjacent the other end of said universal joint, said vibration damper units being tuned to different frequencies.

5. In a motor vehicle drive train comprising a transmission output shaft and a drive shaft having adjacent end portions drivingly interconnected by a universal joint, a first tuned, inertia type, vibration damper unit drivingly connected about said output shaft immediately adjacent one end of said universal joint, and a second tuned, inertia type, vibration damper unit drivingly connected about said drive shaft immediately adjacent the other end of said universal joint, said vibration damper units being tuned to different frequencies and each vibration damper unit comprising a support ring fixed to the associated shaft, an inertia ring surrounding the support ring and spaced therefrom, and resilient means arranged between and connecting the spaced rings.

6. In a motor vehicle drive train, a transmission output shaft, a brake drum drivingly connected to said output shaft, a drive collar drivingly connected to said output shaft, and an inertia type vibration damper mounted on and extending about said collar comprising a support ring drivingly connected to said collar, a resilient ring surrounding said support ring, and an inertia ring surrounding said resilient ring and compressing it against said support ring.

7. In a motor vehicle drive train, a transmission output shaft, a drive collar drivingly connected to said output shaft, and an inertia type vibration damper mounted on and extending about said collar comprising a support ring drivingly connected to said collar, a resilient ring surrounding said support ring, and an inertia ring surrounding said resilient ring and compressing it against said support ring.

8. In a motor vehicle drive train, a transmission output shaft, a drive collar drivingly connected to said output shaft, and an inertia type vibration damper mounted on and extending about said collar comprising a support ring drivingly connected to said collar, a resilient ring surrounding said support ring, and an inertia ring surrounding said resilient ring and compressing it against said support ring, a universal joint connecting said output shaft drive collar to a drive shaft, and a second inertia type vibration damper mounted on said drive shaft.

9. In a motor vehicle drive train, a transmission output shaft, a drive collar drivingly connected to said output shaft having an axially extending flange portion, and an inertia type vibration damper mounted on and extending about said collar flange portion comprising a support ring drivingly connected to said flange portion, a resilient ring surrounding said support ring, and an inertia ring surrounding said resilient ring and compressing it against said support ring, a universal joint connecting said output shaft drive collar to a drive shaft, and a second inertia type vibration damper mounted on said drive shaft immediately adjacent said universal joint.

10. In a motor vehicle drive train, a transmission output shaft, a drive collar drivingly connected to said output shaft having an axially extending flange portion, and an inertia type vibration damper mounted on and extending about said collar flange portion comprising a support ring drivingly connected to said flange portion, a resilient ring surrounding said support ring, and an inertia ring surrounding said resilient ring and compressing it against said support ring, a universal joint connecting said output shaft drive collar to a drive shaft, and a second inertia type vibration damper mounted on said drive shaft immediately adjacent said universal joint, said vibration damper units being tuned to different frequencies.

11. In a motor vehicle drive train, a transmission output shaft, a drive collar drivingly connected to said output shaft having an axially extending flange portion, and an inertia type vibration damper mounted on and extending about said collar flange portion comprising a support ring drivingly connected to said flange portion, a resilient ring surrounding said support ring, and an inertia ring surrounding said resilient ring and compressing it against said support ring, a universal joint connecting said output shaft drive collar to a drive shaft, and a second inertia type vibration damper mounted on said drive shaft immediately adjacent said universal joint, said vibration damper units being tuned to different frequencies, said second vibration damper unit comprising a rubber ring encircling the exterior surface of the drive shaft and a multi-section inertia ring fastened about said resilient ring and effecting compression thereof.

12. In a motor vehicle drive train, a transmission output shaft, a drive collar drivingly connected to said output shaft, and an inertia type vibration damper mounted on and extending about said collar comprising a support ring drivingly connected to said flange portion, a resilient ring surrounding said support ring, and an inertia ring surrounding said resilient ring and compressing it against said support ring, a universal joint connecting said output shaft drive collar to a drive shaft, and a second inertia type vibration damper mounted on said drive shaft immediately adjacent said universal joint, said vibration damper units being tuned to different frequencies, said second vibration damper unit comprising a rubber ring encircling the exterior surface of the drive shaft and a multi-section inertia ring fastened about said resilient ring and effecting compression thereof, said multi-section inertia ring comprising a pair of semi-circular ring sections each having a pair of bolt-receiving bores therein, and bolt connectors mounted in said bolt-receiving bores and connecting said ring sections.

13. In combination with a vehicle drive train propeller shaft having a universal joint at one end and a differential gear unit at the other end, a vibration damper mounted on a portion of said propeller shaft adjacent said universal joint and comprising a strip of resilient material encircling said portion of the propeller shaft and an inertia ring encircling said strip of resilient material, said inertia ring comprising a multi-section ring of substantially T-shaped cross-section fastened about and seated on said resilient strip so as to compress it against said propeller shaft.

References Cited in the file of this patent

UNITED STATES PATENTS

| 1,627,936 | Swenson | May 10, 1927 |
| 2,209,477 | Reibel | July 30, 1940 |
| 2,269,966 | Wemp | Jan. 13, 1942 |
| 2,779,211 | Henrich | Jan. 29, 1957 |

FOREIGN PATENTS

| 329,436 | Great Britain | Dec. 16, 1929 |